United States Patent
Otsuka et al.

(10) Patent No.: US 6,344,802 B1
(45) Date of Patent: Feb. 5, 2002

(54) CONTROL SYSTEM

(75) Inventors: Toru Otsuka, Fujisawa; Takeo Hashimoto, Kawasaki; Hiroshi Watanabe, Chigasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/514,361

(22) Filed: Feb. 28, 2000

(30) Foreign Application Priority Data

Mar. 29, 1999 (JP) .......................................... 11-085991
Sep. 3, 1999 (JP) .......................................... 11-250513
Nov. 9, 1999 (JP) .......................................... 11-318816

(51) Int. Cl.$^7$ .......................... H04Q 3/00; G05B 23/02
(52) U.S. Cl. ........................ 340/825; 340/3.1; 340/3.31; 340/3.5; 340/501; 340/511; 340/517; 700/10; 700/11; 700/12
(58) Field of Search ........................ 340/825, 3.1, 3.31, 340/3.32, 3.44, 3.6, 3.5, 501, 511, 517; 700/10–12

(56) References Cited

U.S. PATENT DOCUMENTS 5,489,989 A * 2/1996 Shimizu et al. .............. 358/448
5,847,659 A   12/1998 Mugitani ................ 340/825.29
5,867,638 A * 2/1999 Sakai et al. .................. 358/468

* cited by examiner

Primary Examiner—Donnie L. Crosland
(74) Attorney, Agent, or Firm—Pillsbury Winthrop LLP

(57) ABSTRACT

A control system is disclosed which permits information captured by each sensor to be sent exactly to a main controller and a fall in the level of sensor signals with time to be automatically compensated for with no need to make sensor signal lines long and without reducing the sensor monitoring accuracy and limiting the number of sensors used. The levels of signals from sensors connected to each of unit controllers are compared with slice levels. The results of comparisons are converted into a serial signal and then transmitted to the main controller. Each time the sensor signal level is monitored, the optimum slice level therefor is set.

24 Claims, 8 Drawing Sheets

CONTROL SYSTEM

CROSS-REFERENCE TO RELATED APPLICATIONS

This application is based upon and claims the benefit of priority from the prior Japanese Patent Applications No. 11-085991, filed Mar. 29, 1999; No. 11-250513, filed Sep. 3, 1999; and No. 11-318816, filed Nov. 9, 1999, the entire contents of which are incorporated herein by reference.

BACKGROUND OF THE INVENTION

The present invention relates to a control system including a main controller and multiple unit controllers each of which has sensors and actuators connected to it.

Heretofore, medium carrier apparatuses for moving media, say, paper, are equipped with a number of sensors (e.g., optical sensors) for detecting the position and state of the media and a number of actuators for separating and moving the medium. Thus, how to transmit actuator- and sensor-related signals to/from a CPU becomes an important problem.

The most straightforward method is to connect simply signal lines associated with all sensors and actuators to the circuit board of a main controller. Another example is line concentration as disclosed in Japanese Patent Publications No. 62-31393 and No. 4-53359.

More specifically, according to the technique disclosed in Japanese Patent Publication No. 62-31393, a signal produced by each sensor is converted into a binary signal representing light and shade by comparing its level with a threshold, called a slice level and the resulting binary signal is then transmitted to a CPU. In the technique disclosed in Japanese Patent Publication No. 4-53359, each sensor signal is converted into a multivalued digital signal according to its level and bits of the resulting digital signal are then transmitted serially.

Continuously turning on the actuators may result in coil burning and machine destruction. It is therefore required not to continue turning on the actuators over a fixed time. In view of this point, control is performed in such a way as to measure time and turn off the actuators after a lapse of a fixed time with a CPU program.

In general, a mechanism section at the start of operation needs more power than is needed after the operation has been started. Control is then performed in such a way as to supply a large current only at the start of operation to create great power and reduce current during the operation and in the hold state after the operation has been completed to thereby reduce power dissipation and heat generated by the actuators.

However, with the aforementioned method to connect all sensor signal lines to the main controller circuit board, long signal lines are required to connect the sensors to the board, resulting in an increase in cost. In addition, depending on the number of signal lines, packaging may become difficult. Moreover, there exists a problem that the signal lines that transmit analog signals are susceptible to noise.

With the technique to transmit binary signals as in Japanese Patent Publication No. 62-31393, the sensor signal level drops gradually due to the life of parts, the effect of ambient temperature, accumulation of dust on parts, and variations in parts mounting accuracy, resulting in failure of proper binarization. In order to compensate for the drop in signal level with time, it is conventionally required for technical personnel to, at regular intervals, measure the level of each sensor signal and adjust the slice level according to measurements. This is a heavy burden to the technical personnel.

With the technique to convert each sensor signal into a digital value (multivalued data) for serial transmission as in Japanese Patent Publication No. 4-53359, the amount of data transmitted from each sensor increases, resulting in the increased interval of transmission from each sensor and consequently in the reduced monitoring accuracy of each sensor. In some cases, the number of sensors that are accommodated may be limited.

The prior art techniques, intended to concentrate signal lines for sensors only, require separate signal lines to control actuators, resulting in an increase in the number of serial lines. It is uneconomical to use many serial lines.

Hereinafter, this problem will be discussed in detail.

First, when all the signal lines are connected to the main controller, the average length of signal lines is much increased, which is uneconomical and may make packaging difficult due to an excess of wiring. In addition, the sensor signal lines, which are long in analog signal transmit portion, are susceptible to noise.

Second, the line concentration only for sensor signal lines suffers from the following problems:

If the sensor output level is transmitted as it is, the line traffic will increase. When the sensor level is transmitted in binary form (on/off) or when the sensor output is two-valued, the setting of a light/shade threshold cannot be automated because the CPU cannot know the sensor output level. Further, the degree of allowance for lowerings of sensor outputs in light condition is small. In addition, actuator control lines are required in addition to sensor circuit control lines.

In summary, with the technique disclosed in Japanese Patent Publication No. 62-31393, since only the on/off state is detected and transmitted, it is impossible for the CPU to know the analog level at on time. Thus, the on/off threshold cannot be altered or, if alterable, it is required to measure the sensor level with a separate measurement instrument and set manually a threshold derived from the measurements.

The technique disclosed in Japanese Patent Publication No. 4-53359, adapted to transmit a digital value corresponding to an analog level as it is, has a problem that the amount of data over data lines increases and it is therefore required to reduce the number of sensors that can be accommodated at the same data transmission rate or to reduce the transmission interval, i.e., the time accuracy of monitoring. In addition, since only the transmission lines for sensor information are concentrated and the controller usually controls motors and solenoids, lines for transmitting actuator operating commands from the CPU and lines for sending the results of control and state information to the CPU are required to be provided separately. This is uneconomical.

With the method to prevent coil burning and machine damage through the use of a CPU program, not only the amount of processing by the CPU increases but, in the event that the CPU causes runaway due to defects in the program or the like, the preventive facility does not work properly, so that coil burning and machine damage result.

BRIEF SUMMARY OF THE INVENTION

It is therefore an object of the present invention to provide a control system which permits information captured by each sensor to be sent exactly to a main controller and a fall in the level of sensor signals with time to be automatically compensated for with no need to make sensor signal lines long and without reducing the sensor monitoring accuracy and limiting the number of sensors used.

It is another object of the present invention to provide a control system which has a main controller having a CPU and each of unit controllers for directly controlling unit mechanisms connected together through serial lines and shares the serial lines for a sensor monitoring function and an actuator control function, thereby allowing the number of the serial lines to be reduced.

It is still another object of the present invention to provide a control system which automatically turns off output ports a fixed time after they are turned on to thereby reduce loading of a CPU and improve safety in the event of a CPU malfunction.

To achieve the objects, according to a first aspect of the present invention there is provided a control system having a main controller and one or more unit controllers each of which has one or more sensors connected, comprising: select means, provided in each of the unit controllers, for selecting sensor signals produced by the sensors in sequence; comparison control means, provided in each of the unit controllers, for making a comparison between the level of a sensor signal produced by each of the sensors and a prestored threshold level and holding the result of each comparison; control means, provided in each of the unit controllers, for converting the contents of the comparison control means into a serial signal and transmitting the serial signal to the main controller; recognition means, provided in the main controller, for recognizing the results of comparisons sent in serial form from each of the unit controllers; and slice level change means, controlled by the main controller, for changing the level stored in the comparison control means.

According to a second aspect of the present invention, there is provided a control system having a main controller and a plurality of unit controllers each of which has a plurality of sensors connected, comprising: select means, provided in each of the unit controllers, for selecting sensor signals produced by the sensors in sequence; A/D conversion means, provided in each of the unit controllers, for converting the level of each of the sensor signals selected by the select means into digital data; comparison control means, provided in each of the unit controllers, for making a comparison between output data of the A/D conversion means and prestored each of the slice levels for the sensors and holding the result of each comparison; designate means, provided in the main controller, for designating each of the unit controllers; control means, provided in each of the unit controllers, for, when the corresponding unit controller is designated by the designate means, converting the contents of the comparison control means into a serial signal and transmitting the serial signal to the main controller; recognition means, provided in the main controller, for converting the results of comparisons sent in serial form from each of the unit controllers into parallel form and recognizing them;

and slice level change means, controlled by the main controller for changing the level stored in the comparison control means.

According to a third aspect of the present invention, there is provided a control system having a main controller and a plurality of unit controllers each having one or more sensors connected and one or more output ports, comprising: a sensor circuit, provided in each of the unit controllers, for transmitting sensor information serially over a first serial line to the main controller; port information transmit means, provided in the main controller, for transmitting ON/OFF information for each of the output ports in each of the unit controllers over a second serial line to the unit controller; an output port circuit provided in each of the unit controllers and responsive to the ON/OFF information for the output ports transmitted from the port information transmit means for performing ON/OFF control of each of the output ports; and command transmit mean s provided in the main controller for transmitting a command signal for controlling the operating state of the sensor circuit and a command signal for controlling the operating state of the output port circuit over a third serial line to each of the unit controllers.

According to a fourth aspect of the present invention, there is provided a control system having a main controller and one or more unit controllers having one or more output ports, each of the unit controller s including: clock generating means for generating a clock signal; counter means for counting the clock signal and producing a forced OFF signal at the time when a preset clock count is reached; ON/OFF information hold means for holding ON/OFF information for the output ports; edge detect means for detecting a change in the ON/OFF information in the ON/OFF information hold means and providing a count enable signal to the counter means at the time when the change is detected; and control means for instructing the counter means as to either whether to output the forced OFF signal or not or whether to count the clock signal or not according to an operation mode set by the main controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will be described first.

Figure 1:
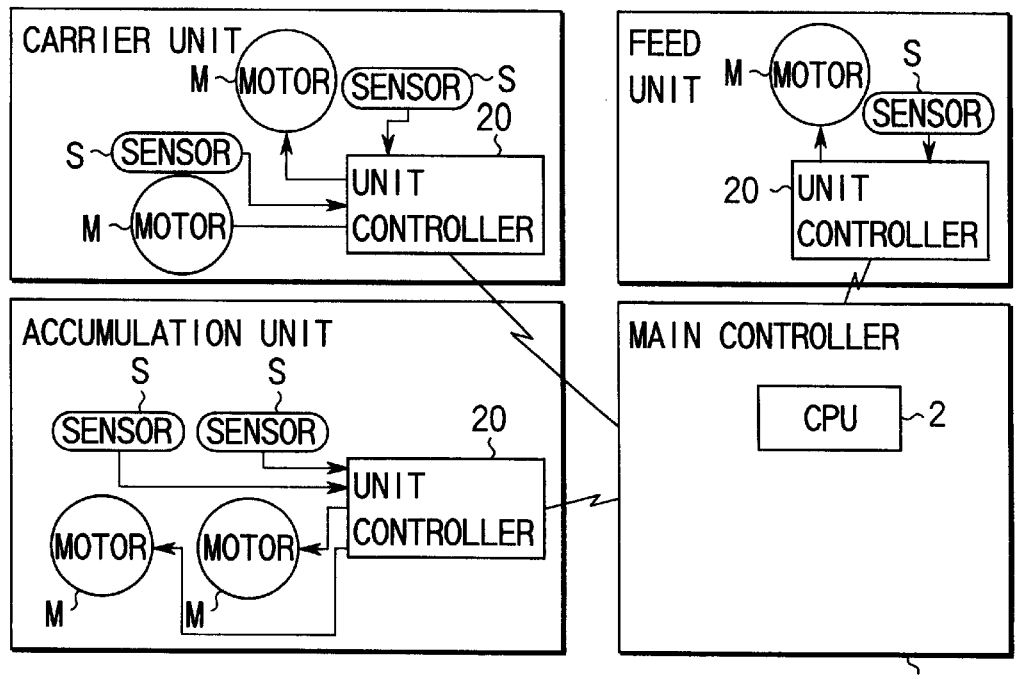
FIG. 1 is a block diagram of a control system according to a first embodiment of the present invention.

In FIG. 1, there is illustrated an arrangement of a medium carrier control system which controls the transportation of a medium such as paper or the like. As shown, to a main controller 1 is connected by serial lines a unit controller 20 for each of a carrier unit, a feed unit, and an accumulation unit. To each unit controller are connected one or more sensors S for detecting the position and state of paper or the like and one or more carrier driving motors M.

Figure 2:
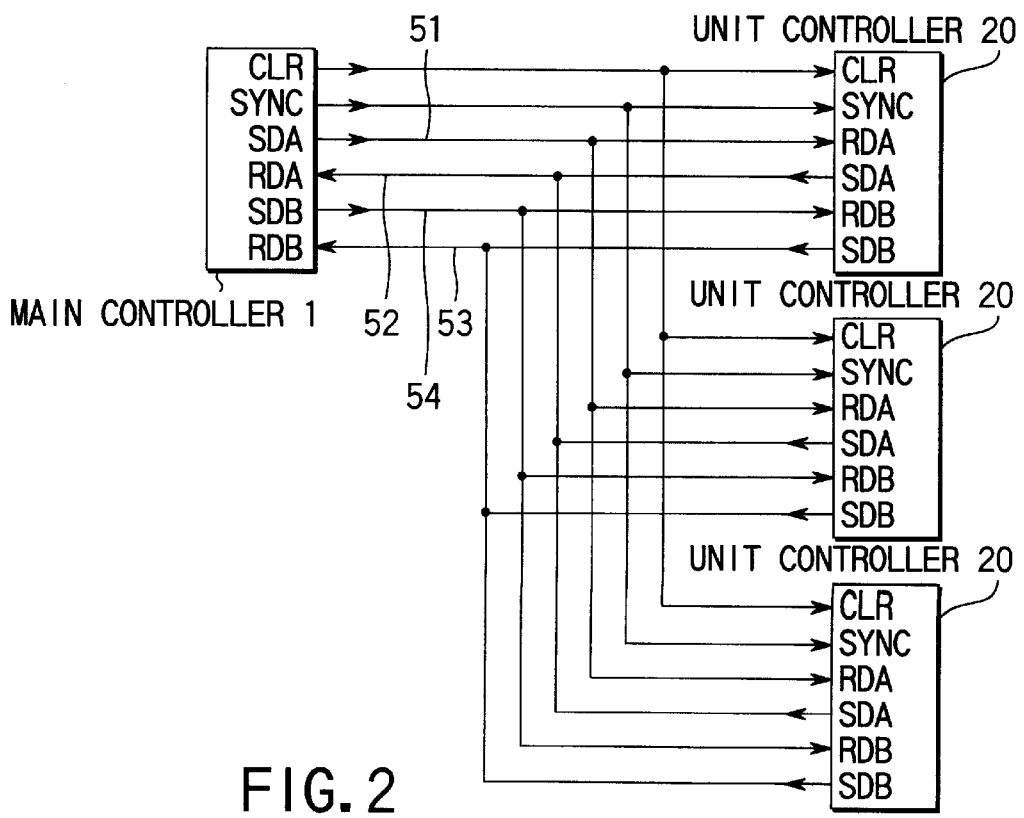
FIG. 2 shows a connection arrangement between the main controller and each unit controller by serial lines in the first embodiment.

FIG. 2 shows connection between the main controller 1 and each unit controller 20 by serial lines, i.e., parallel connection thereof by six serial lines.

Figure 3:
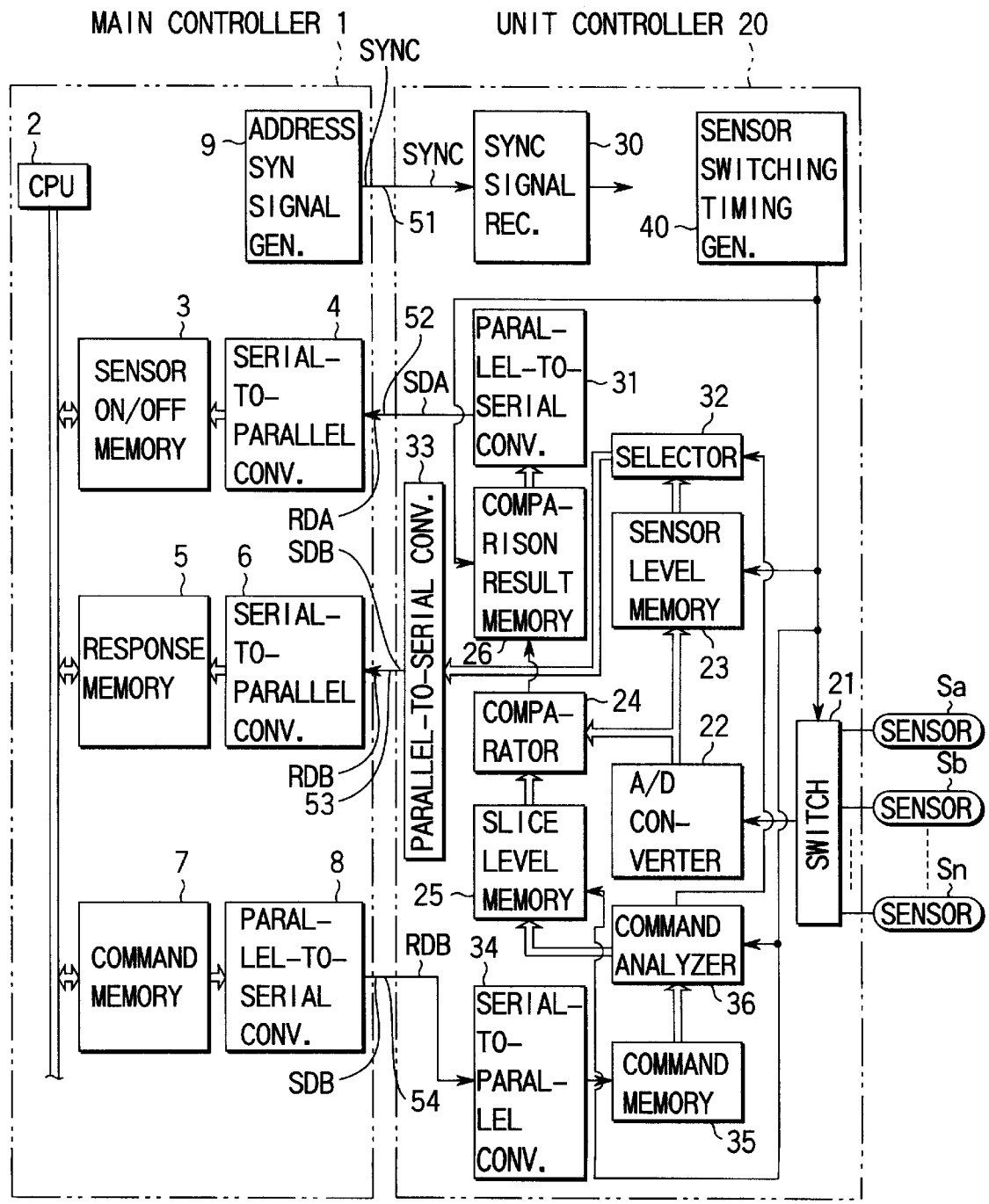
FIG. 3 shows the main controller and each unit controller in the first embodiment in more detailed block diagram form.

FIG. 3 shows an detail arrangement of main components of the main controller 1 and the unit controller 20 shown in FIG. 2.

As shown in FIG. 3, the main controller 1 includes a CPU 2 to which a sensor on/off memory 3, a response memory 5, and a command memory 7 are connected. The sensor on/off memory 3 is connected through a serial-to-parallel converter 4 to a serial line 52. The response memory 5 is connected through a serial-to-parallel converter 6 to a serial line 53. The command memory 7 is connected through a serial-to-parallel converter 8 to a serial line 54.

The main controller 1 further includes an address sync signal generator 9, which is connected to a serial line 51.

The unit controller 20 includes a switch 21 as a select means, to which a plurality of sensors Sa, Sb, . . . , Sn are connected. In response to timing signals supplied from a sensor switching timing signal generator 40 the switch 21 repeatedly scans the sensors on a time-division basis to thereby output a signal produced by each sensor (hereinafter referred to as a sensor signal) in sequence.

The level of each sensor signal selected by the switch 21 is converted by an analog-to-digital (A/D) converter 22 into digital data, which is in turn applied to a sensor level memory (signal level holding means) 23 and a comparator 24.

The comparator 24 compares each sensor level data from the A/D converter 22 with a corresponding one of multiple slice levels prestored in a slice level memory 25. The result of the comparison is held in a comparison result memory 26. Responsive to the timing signal from the sensor switching timing generator 40, the slice level memory 25 sequentially provides each slice level corresponding to a respective one of the sensors at the same time the corresponding sensor is selected by the switch 21. The comparator 24, the slice level memory 25 and the comparison result memory 26 construct comparison control means.

The result of each comparison in the comparison result memory 26 is output sequentially according to a timing signal (not shown) independent of the sensor scan and then converted into a serial signal by a parallel-to-serial converter 31. The serial signal thus converted is sent to the serial-to-parallel converter 4 in the main controller 1 over the serial line 52.

Each sensor level data in the sensor level memory 23 is read sequentially according to a timing signal (not shown) independent of the sensor scan, then selected by a selector 32 as instructed by a command analyzer 35 to be described later and converted into a serial signal in a parallel-to-serial converter 33. The serial signal thus converted is sent to the serial-to-parallel converter 6 in the main controller 1 over the serial line 53.

A serial-to-parallel converter 34 converts a command sent over the serial line 54 from the parallel-to-serial converter 8 in the main controller 1 into parallel form. The command thus converted is held in a command memory 35 and then analyzed by the command analyzer 36.

The command analyzer 36 analyzes a given command in the command memory 35 and then instructs the selector 32 to send sensor level data in the sensor level memory 23 to the main controller 1. The serial-to-parallel converter 34, the command memory 35, the command analyzer 36 and the selector 32 constitute first command execute means.

The command analyzer 36 analyzes multi slice levels from a given command in the command memory 35 and enters the analyses into the slice level memory 25. The serial-to-parallel converter 34, the command memory 35 and the command analyzer 36 constitute second command execute means.

The command analyzer 36 has control means which, upon receipt of a command from the main controller 1, allows the said command (a return command for echo back check) to be immediately sent back to the main controller over the selector 32 and the parallel-to-serial converter 33.

Reference numeral 30 denotes a sync signal receiver, which is connected with the address/sync signal generator 9 in the main controller 1 through the serial line 51 to receive a sync signal from the address sync signal generator.

Figure 4:
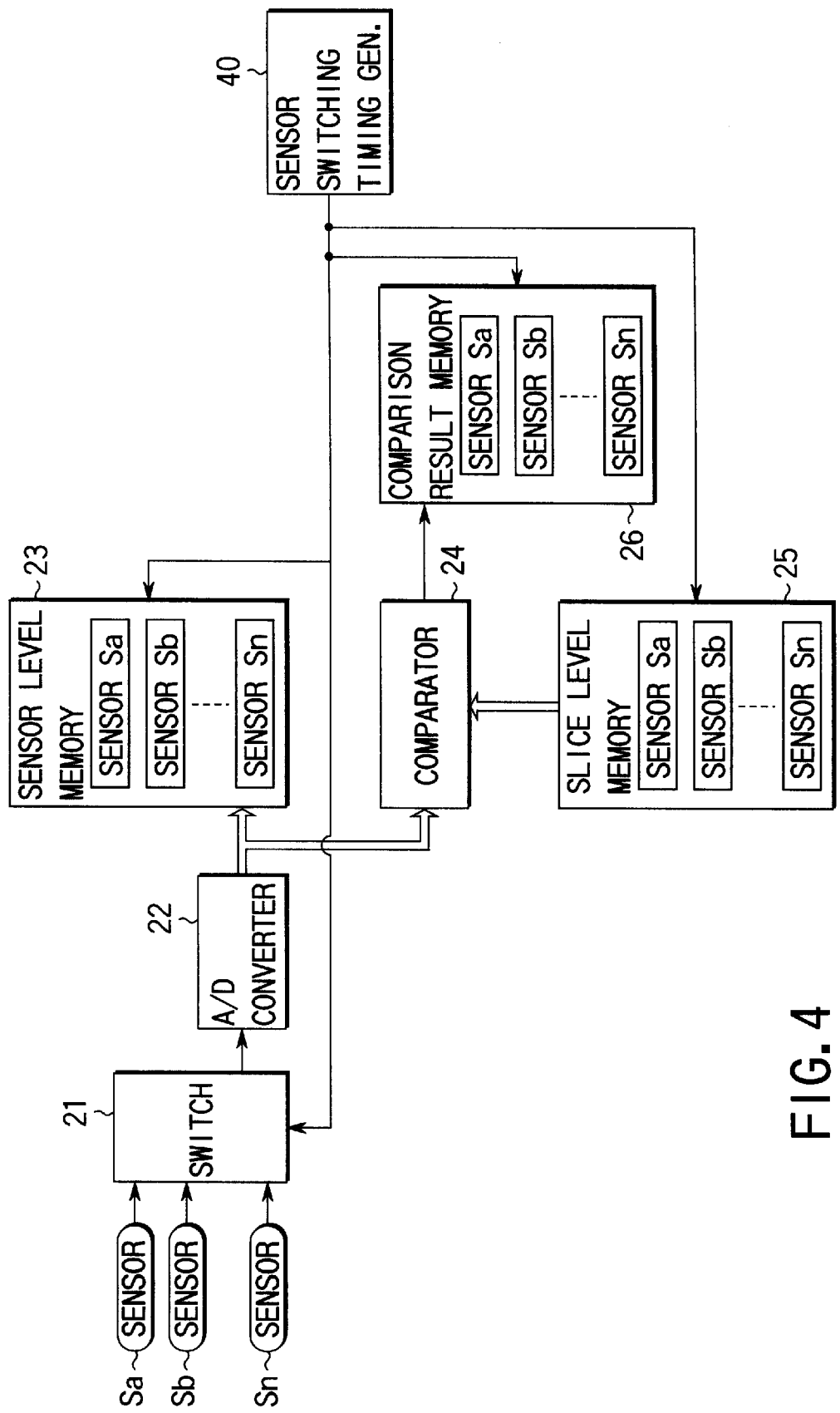
FIG. 4 shows main components in the unit controller in FIG. 3.

FIG. 4 shows only the main components in the unit controller 20.

As shown, each of the sensor level memory 23, the slice level memory 25 and the comparison result memory 26 is configured to hold (store) data corresponding in number to the sensors Sa, Sb, . . . , Sn.

The CPU 2 in the main controller 1 has the following functions as a slice level change means:

(1) Designating each of the unit controllers 20 in sequence.

(2) Recognizing the result of each comparison sent from each unit controller and held in the sensor on/off memory 3 in the form of an on/off signal for each sensor as the result of detection by that sensor.

(3) When a unit controller is designated, setting up a command to request the designated unit controller to send each sensor level data stored in its sensor level memory 23 and sending the command after temporary storage in the command memory 7 to the designated unit controller in serial form.

(4) Setting multi slice levels for the sensors Sa, Sb, . . . , Sn according to sensor level data sent from each unit controller, setting up a command to allow the slice levels to be held in the corresponding unit controller, and sending that command after temporary storage in the command memory 7 to the corresponding unit controller in serial form.

(5) Executing echo back check based on the command return from each unit controller.

Figure 5:
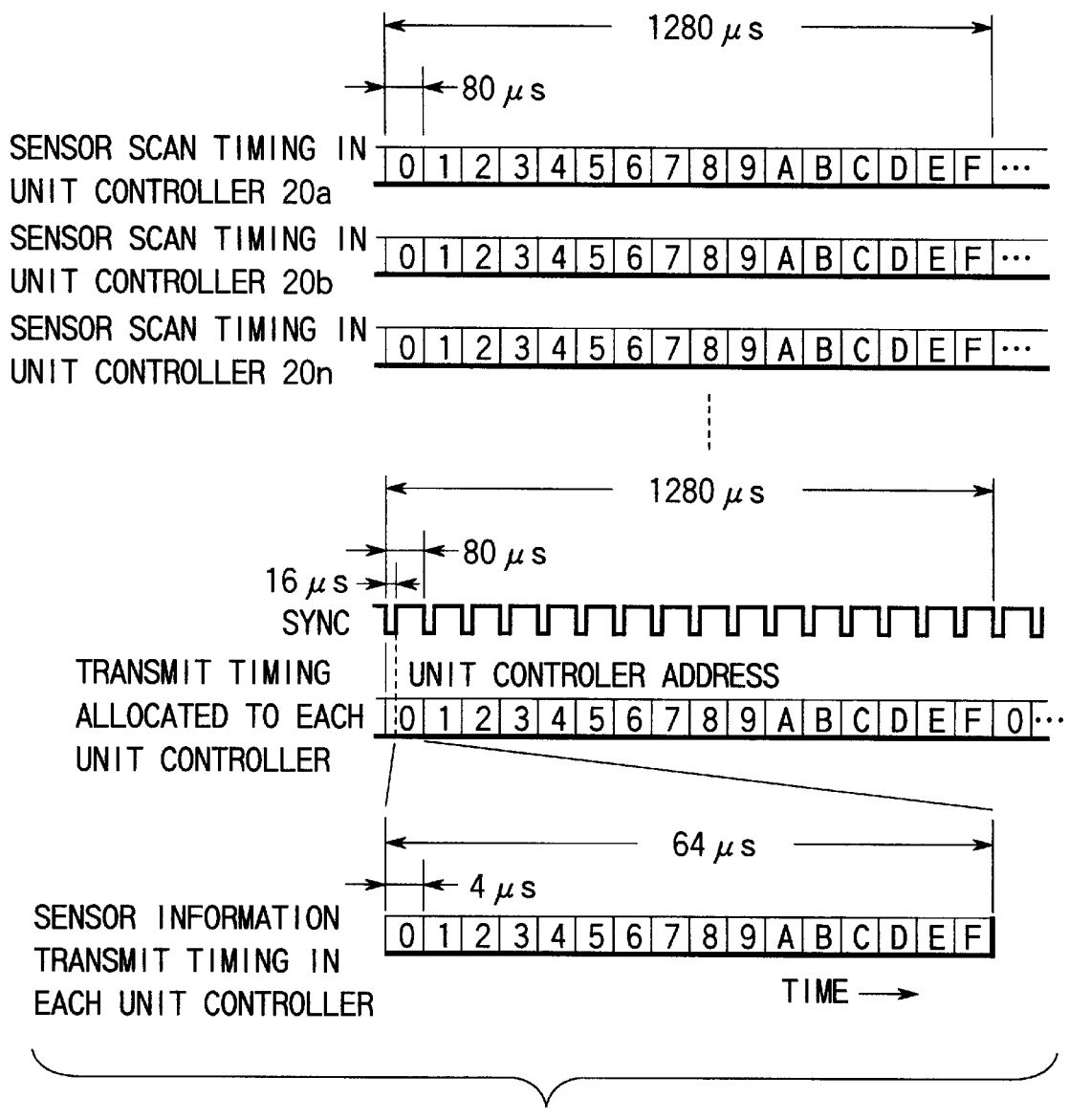
FIG. 5 is a timing diagram for use in explanation of workings of the control system of the first embodiment.
Figure 6:
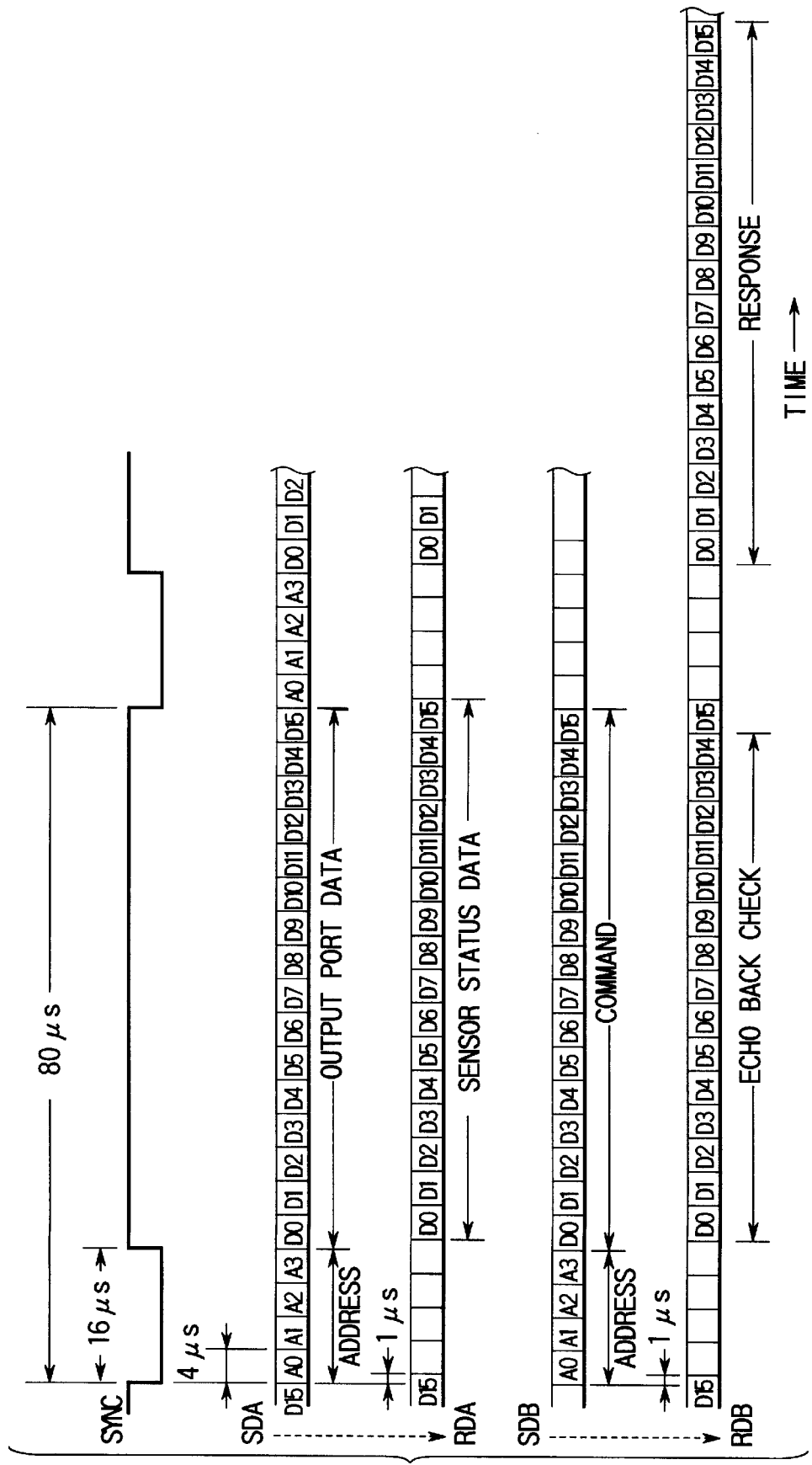
FIG. 6 is a timing diagram for use in explanation of workings of the control system of the first embodiment.

Reference is made to FIGS. 5 and 6 to describe the workings of the system thus configured.

In each of the unit controllers 20 (identified as 20a, 20b, ..., 20n in FIG. 5), each of the sensors Sa, Sb, . . . , Sn is scanned for a given length of time, say, 80 µs. If the sensors are 16 in number, then it will take 1280 µs to scan all the sensors.

By the SYNC signal from the main controller 1, each unit controller is addressed for a given period of time, say, 80 µs. For the first low-level interval 16 µs of 80 µs, address data is allocated and the remaining high-level interval 64 μs is used to transmit sensor information in the corresponding unit controller. The detail of it is described after as a second embodiment.

To transmit information, each sensor is allocated 4 μs, the result of division of 64 μs, i.e., the time period allocated for each unit controller to transmit sensor information, by 16, i.e., the number of sensors.

Each sensor signal is converted by the A/D converter 22 into digital data, which is in turn fed into the comparator 24 and the sensor level memory 23 as sensor level data.

In the comparator 24, each sensor level data from the A/D converter 22 is compared with the corresponding slice level from the slice level memory 25. If the sensor level is higher than the corresponding slice level, a light signal at logic level 1 is output from the comparator 24; otherwise, a shade signal at logic level 0 is output. The light and shade signals are stored in the comparison result memory 26.

In each unit controller 20, when the SYNC signal is low, a decision is made as to whether address data matches its address. When the address match occurs, the output of the comparison result memory 26 is subjected to parallel-to-serial conversion and then sent to the main controller 1.

In the main controller 1, the result of each comparison sent from the unit controller 20 is subjected to serial-to parallel conversion and then stored in the sensor on/off memory 3 as a sensor on/off signal. The sensor on/off signal is recognized as the result of detection by the corresponding sensor.

In the main controller 1, a command to request a designated unit controller to send each sensor level data stored in its sensor level memory 23 is set up and then transferred to the designated unit controller.

In the designated unit controller, based on that command from the main controller, each sensor level data (sensor status data) is read from the sensor level memory 23 and then sent to the main controller.

In the main controller, multiple slice levels for the sensors Sa, Sb, . . . , Sn are set based on the sensor level data sent from the unit controller, and a command to store the slice levels in the slice level memory 25 of the corresponding unit controller is set up and then sent to that unit controller.

In the unit controller, the slice levels for the sensors Sa, Sb, . . . , Sn are determined by analyzing the command from the main controller and then stored in the slice level memory 25.

Each command is sent from the main controller to the unit controller over the serial line 54. To indicate that the command has been received, the unit controller sends the same command back to the main controller over the serial line 53 immediately after it is received.

At this point, in the main controller, an echo back check is made based on the return of the same command as was transmitted. This echo back check is made through the use of an existing serial line, not by using any dedicated transmission line, thus checking an increase in cost.

As described above, the first embodiment is configured such that, even if multiple sensors Sa, Sb, . . . , Sn are connected to each unit controller, the results of comparisons between the levels of sensor signals and the corresponding slice levels are transmitted in serial form to the main controller. Therefore, a disadvantage of each sensor signal line needing to be long as in the prior art is eliminated and information captured by each sensor can be transmitted with certainty.

Each sensor signal line needing not to be long allows the prevention of an increase in cost and the elimination of mounting restrictions which might occur, depending on the number of sensors. Moreover, there is an advantage that transmission lines are less susceptible to noise because the length of analog signal transmitting portions needs not to be long.

Each sensor signal level is transmitted in the form of the result of comparison with the corresponding slice level but not in the A/D converted form, thus eliminating disadvantages that the sensor monitoring accuracy is reduced and the number of sensors is limited as in the prior art in which digital values (multivalued data) are transmitted as they are.

In addition, each sensor signal level is monitored and the optimum slice level is set accordingly, thus allowing automatic compensation for lowering of each sensor signal level with time, alleviating the burden on the person in charge, and improving the reliability of detection by sensors.

Although the first embodiment has been described in terms of a medium transport control system, this is not restrictive. The principles of the present invention are also applicable to other control systems.

A second embodiment of the present invention will be described next.

Figure 7:
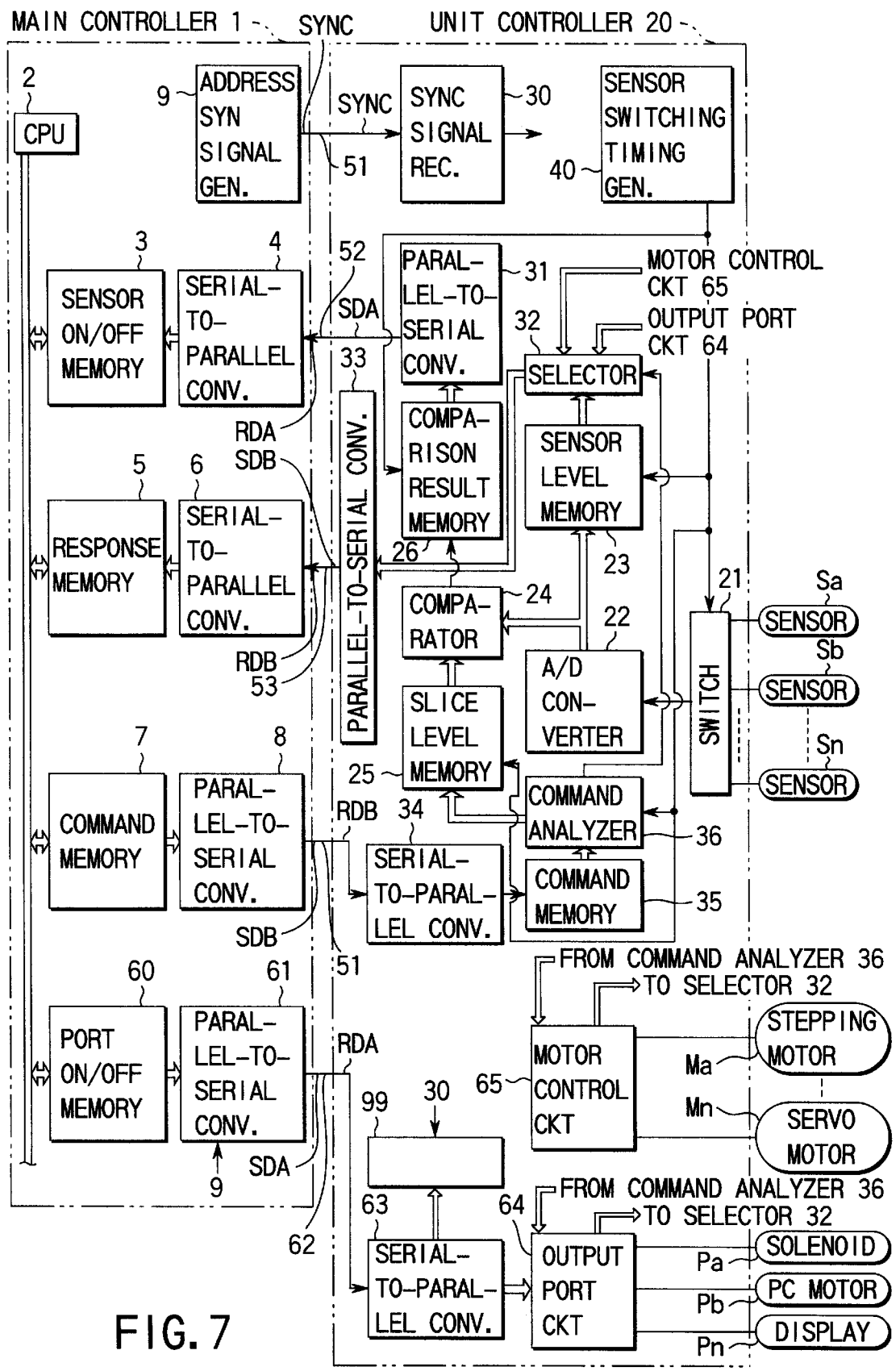
FIG. 7 shows the main controller and each unit controller in a control system according to second and third embodiments.

FIG. 7 shows main components of the main controller 1 and the unit controller 20 of a control system according to the second embodiment.

In FIG. 7, like reference numerals are used to denote corresponding components to those in FIG. 3 and repeated description thereof is omitted. The features of the second embodiment will be described mainly.

In the second embodiment, the main controller 1 further includes a port ON/OFF memory 60 connected to the CPU 2. The port ON/OFF memory is connected to a serial line 61 through a parallel-to-serial converter 61. The serial line 62 is connected to an output port circuit 64 through a serial-to-parallel converter 63 in the unit controller 20. The output port circuit is connected to a solenoid Pa, a DC motor Pb, and a display Pn.

The address sync signal generator 9 is connected to the serial line 51 and the parallel-to-serial converter 61.

As shown in FIG. 6, when the SYNC signal is low level, the address signal (A0–A3) of the address sync signal generator 9 is sent to the parallel-to-serial converter 61, and the parallel-to-serial converter 61 output the address signal (A0–A3) as a SDA signal to the serial line 62.

On the other hand, the serial-to-parallel converter 63 of the unit controller 20 is received the SDA signal from the serial line 62, and output it to the address analyze section 99 and the output port circuit 64.

When the SYNC signal is low level, the address analyze section 99 analyze whether the address (A0–A3) of the RDA signal is about the unit controller or not. And when the address analyze section 99 analyze that the RDA signal is about the output port circuit 64, the output port circuit 64 take in the RDA signal as a output port data, synchronized by high level of the SYNC signal.

In the unit controller 20 is placed a motor control circuit 65 to which stepping motors Ma through Mn are connected.

Note here that the serial lines 52, 53, 54 and 62 correspond to first, fourth, third and second serial lines, respectively, described in claims. Further, the command memory 7 and the parallel-to-serial converter 8 correspond to command transmit means and the port ON/OFF memory 60 and the parallel-to-serial converter 61 correspond to port information transmit means.

Hereinafter, the operation of the motor control circuit 65 will be described in detail.

For control of the motors, the motor control circuit 65 is supplied from the main controller 1 through the serial line 54 with parameters such as initial speeds, maximum speeds, acceleration rates, deceleration rates, amounts of rotation and the like for the motors and commands to start and stop the motors.

The CPU 2 first writes parameters and commands to be sent to the motor control circuit 65 into the command memory 7. The parallel-to-serial converter 8 then reads the parameters and commands from the command memory 7, converts them into serial information, and transmits the serial information to the serial-to-parallel converter 34 over the serial line 54. The serial information is converted by the serial-to-parallel converter 34 into parallel information, which is in turn written into the command memory 35. The parallel information is analyzed by the command analyzer 36 in the same way as sensor circuit control commands (sensor level read and slice level set commands). When parameters and commands are found, on analysis, to be ones to be sent to the motor control circuit 65, they are sent to the motor control circuit. The motor control circuit operates the motors according to the parameters and commands thus sent.

If the parameters and commands are ones that require the results of operation to be sent back to the main controller, the motor control circuit 65 sends the results of operation to the selector 32. At this point, the command analyzer 36 controls the selector 32 to allow the results of operation to be sent to the parallel-to-serial converter 33 for conversion into serial information. The resulting serial information is then sent over the serial line 53 to the serial-to-parallel converter 6 in the main controller and converted into parallel information. This parallel information is retained in the response memory 5. Thus, the CPU 2 is allowed to read the responses of the motor control circuit 65.

The operation of the port ON/OFF memory 60 will be described next.

The CPU 2 writes a 1 into that address in the port ON/OFF memory which corresponds to an output port when it is to be turned ON or a 0 when it is to be turned OFF. The parallel-to-serial converter 61 converts information in the port ON/OFF memory 60 into serial form and sends it to the serial-to-parallel converter 63 over the serial line 62. The output port ON/OFF information thus converted into parallel form is read by the output port circuit 64. The output port circuit 64 is responsive to the output port ON/OFF information to set the output of the corresponding port.

If it is required to send the results of operation back to the main controller as with the motor control circuit 65, then the output port circuit 64 sends the results of operation to the selector 32. At this point, the command analyzer 36 controls the selector 32 to allow the results of operation to be sent to the parallel-to-serial converter 33 for conversion into serial information. The resulting serial information is sent to the serial-to-parallel converter 6 in the main controller 1 over the serial line 53 and then retained in the response memory 5 in parallel form. Thus, the CPU 2 is allowed to read the response of the output port circuit 84.

To summarize, the control system of the second embodiment allows all the commands for the sensors Sa to Sn, the output port circuit 64 and the motor control circuit 65 to be sent from the main controller 1 to the unit controller 20 over the same serial line 54.

That is, under the control of the CPU 2 in the main controller 1, each command is stored in the command memory 7, converted into serial information by the parallel-to-serial converter 8, and sent to the serial-to-parallel converter 34 in the unit controller 20 over the serial line 54. In the unit controller, the command analyzer 36 checks the control command for destination and sends it to the destination section. Upon receipt of the command, the destination section performs a required operation.

If the parameters and commands sent to each unit require the results of operation to be sent back to the main controller, then the response of the unit is sent via the selector 32, the parallel-to-serial converter 33, the serial line 53 and the serial-to-parallel converter 6 to the response memory 5 and stored therein. Thus, the CPU 2 is allowed to read the response of each unit.

Thus, commands for controlling the operating states of the sensors Sa to Sn, commands for controlling the operating states of the output port circuit 64 and commands for the motor control circuit 65 to start and stop the motors can be sent over the same serial line 54. In addition, responses from the sensors Sa to Sn, responses from the output port circuit 64 and responses from the motor control circuit 65 can be sent over the same serial line 53.

In the present control system, an output signal of each of the sensors Sa to Sn is output in sequence via the switch 21 and then converted into a digital signal in the A/D converter 22. The digital signal is then compared in the comparator 24 with the corresponding threshold level prestored in the slice level memory 25. The result of comparison is stored into the comparison result memory 25 and then converted by the parallel-to-serial converter 31 into a serial signal, which is in turn sent to the serial-to-parallel converter 4 in the main controller 1 over the serial line 52. In the serial-to-parallel converter 4, the serial signal is converted into a parallel signal, which is then stored into the sensor on/off memory 3. Such a configuration and operation allow increased transmission efficiency.

As described above, in the control system of the second embodiment, signals are serialized and multiplexed between the main controller 1 and the unit controller 20 and moreover sensor signals are transmitted in the form of the results of comparisons with slice levels but not in the form of analog levels. This results in the reduced amount of wiring and the reduced transmission capacity and consequently in the reduced cost.

Moreover, sensor signals are captured in the form of analog levels (as opposed to threshold levels of 0s and 1s) and then retained in the form of digital signals. The sensor signal levels are sent to the main controller as requested by the main controller, thus allowing the CPU to know the sensor signal level values as required.

Furthermore, by allowing the slice levels to be set from the main controller side, automatic adjustment of slice levels can be made to provide for variations from sensor to sensor and changes in sensor characteristic with time. In addition, the CPU can detect that the sensor level falls below a specified value with notice to the operator or the person in charge of maintenance.

The control is divided between the CPU side and the actuator side and operation control information is transmitted in multiplexed form between both the sides, reducing the amount of wiring.

A serial line is used for both the transmission of sensor circuit control information and the transmission of actuator control information, allowing the number of the serial lines to be reduced.

A third embodiment of the present invention will be described next.

The control system of the third embodiment is basically the same as the control system shown in FIG. 7. The third embodiment will therefore be described mainly in terms of its features with the reference numerals in FIG. 7 used as they are.

Figure 8A:
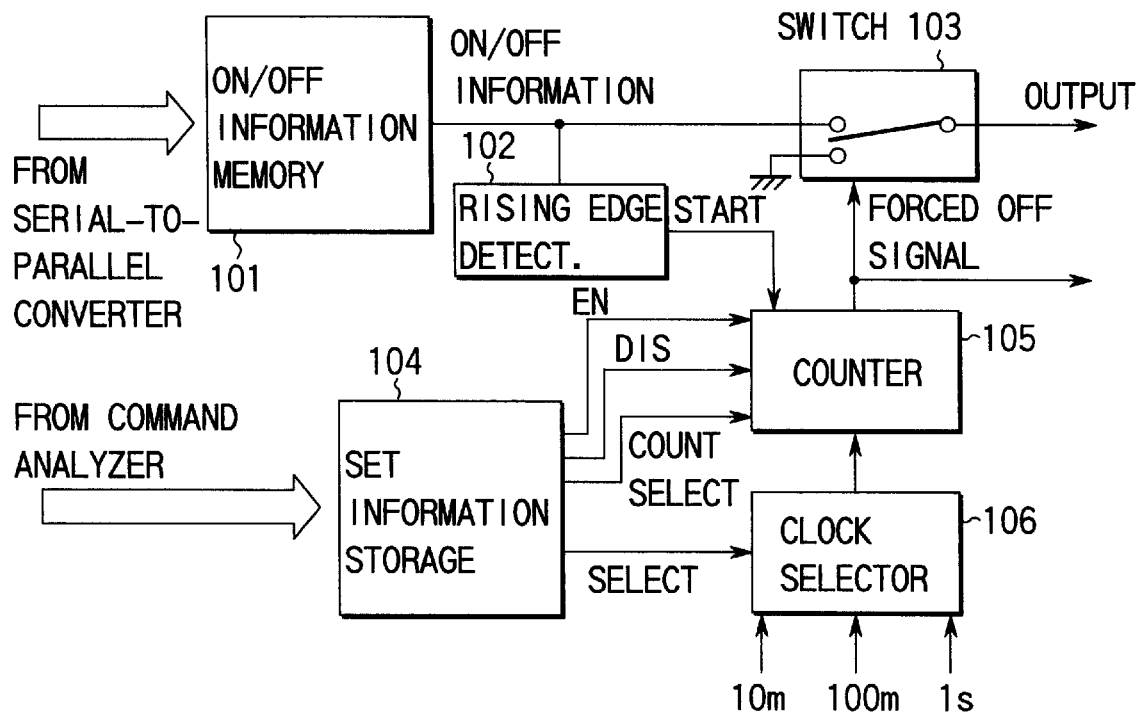
FIG. 8A shows an internal arrangement of the output port circuit of FIG. 7.

FIG. 8A is a block diagram of the output port circuit 64.

The arrangement shown in FIG. 8A corresponds to one output port. In the presence of n number of output ports, therefore, the control system will require n number of such output port circuits as shown in FIG. 8A.

Port ON/OFF information from the serial-toparallel converter 63 is retained in an ON/OFF information memory 101. The port ON/OFF information is output from the memory 101 to the corresponding output port via a switch 103.

In the presence of an output port control command from the command analyzer 36, set information in that command is written into a set information memory 104.

According to the contents of the set information memory 104, a select signal to a clock selector 106 and a counter select signal and forced OFF function enable (EN) and disable (DIS) signals to a counter 105 are output in sequence.

The clock selector 106 is responsive to the state of the select signal to make a selection among 10-msec, 100-msec and 1-sec clocks. The counter 106 is responsive to the counter select signal to set the number of times clocks are counted to either 1, 4 or 8.

Upon receipt of a start signal from a rising edge detect circuit 102 when the forced OFF function is enabled (the enable signal is ON), the counter 105 starts counting clocks. When the set number of clocks is counted, the counter turns a forced OFF signal ON, thereby placing the switch 103 to the ground position to turn the port output OFF. When the port is OFF before time out, the counter is cleared.

When the forced OFF function is disabled (the disable signal is ON), the forced OFF signal goes OFF. Once turning the forced OFF signal ON, the counter 105 holds the forced OFF state until the disable signal is turned ON.

When a unit controller status acquire command is fed into the command analyzer 36, the state of the forced OFF signal the counter 105 is providing is selected by the selector 32 and then sent to the CPU 2 over the serial line.

In this manner, the CPU 2 can know whether the forced OFF function for each output port is operating or not.

Figure 8B:
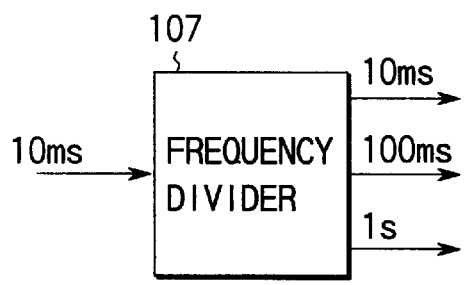
FIG. 8B shows a frequency divider.

FIG. 8B shows an arrangement of a frequency divider. As shown, the frequency divider divides the frequency of a clock of 10 msec in period to produce 10-msec, 100-msec and 1-sec clocks, which are applied to the clock selector 100.

Figure 9:
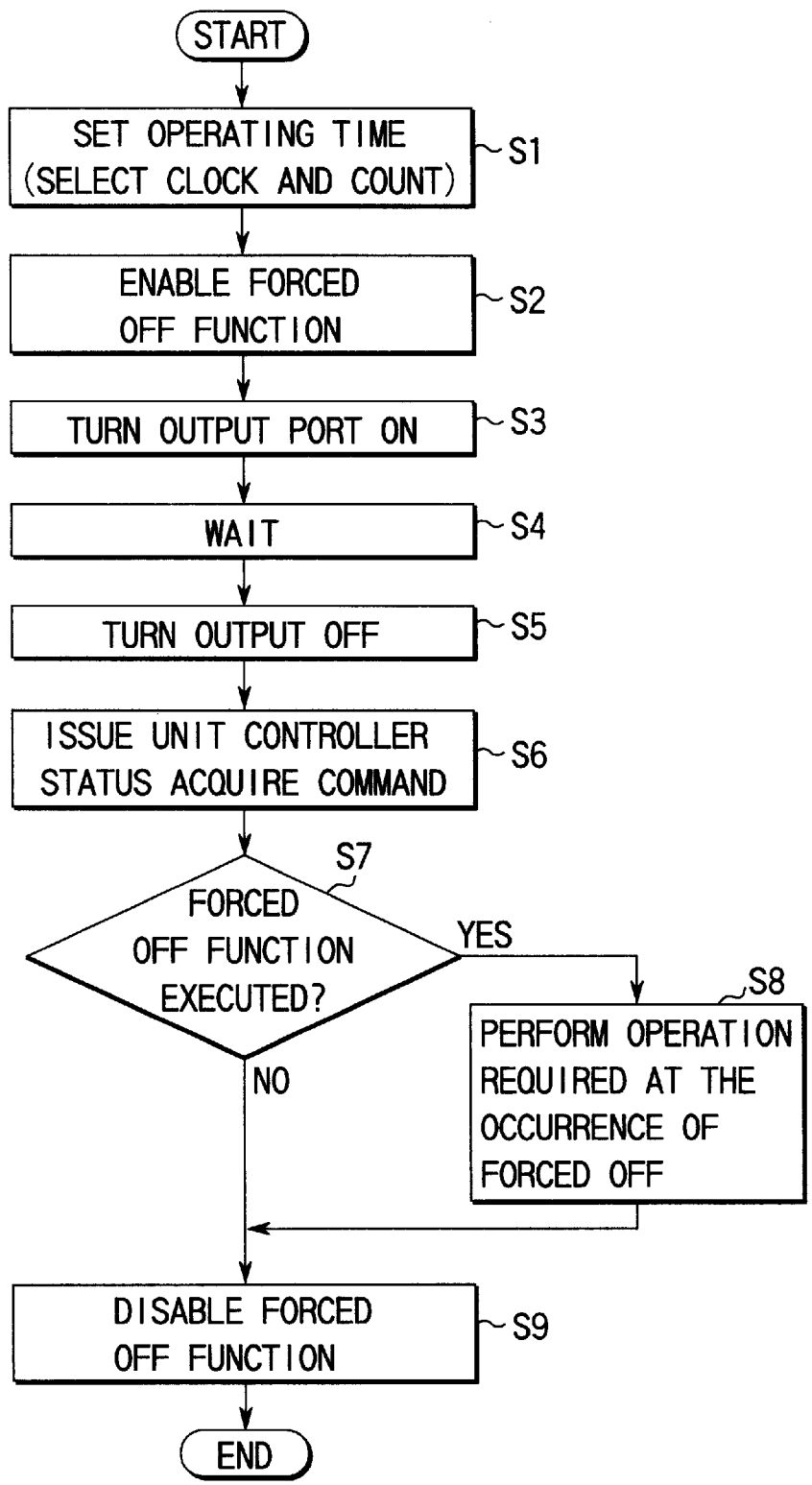
FIG. 9 is a flowchart for an output port control sequence when a forced off function is performed.

Reference is next made to a flowchart of FIG. 9 to describe an example of an output port control sequence when the forced OFF function is used.

Upon entry to the sequence, a basic clock and a clock count are first selected to set the operating time of the forced OFF function (step Si).

After that, the forced OFF function is enabled (step S2) and the output port is turned ON (step S3). After a lapse of a time during which the output port is to be turned ON or after a lapse of a time during which other processing is carried out (step S4), the output port is turned OFF (step S5). If there is a need to know whether or not the forced OFF function has been operated (whether or not the protection function has been put into operation), then a unit controller status acquire command is issued (step S6). As a result, if the forced OFF function has been operated, processing, such as abnormality processing, which is required when the forced OFF operation has been performed is carried out (steps S7 and S8). The forced OFF function is then disabled to complete the processing (step S9).

In the embodiments described so far, the frequency divider 107 and the clock selector 106 correspond to clock generating means described in claims. The counter 105 corresponds to counter means, the ON/OFF information memory 101 to ON/OFF information hold means, the rising edge detect circuit 102 to edge detect means, and the set information memory 104 to control means.

Further, the CPU 2 corresponds to designate means. The port ON/OFF memory 60 and the parallel to serial converter correspond to transmission control means. The command memory 7 and the parallel to serial converter 8 correspond to command hold transmit means.

The third embodiment offers the following advantages:

The loading of the CPU can be reduced by hardware-based processing.

Even in the event of runaway of the CPU, the protection function can be put into operation with certainty to improve safety. Since the protection circuit can be built into an integrated circuit, the circuit board is required to be small in area, resulting in reduced cost. Both the forced OFF function of preventing coil burning and the function of flowing large current only at startup can be implemented through the use of the same circuit.

Since the monitoring function is divided between the CPU side and the sensor side and sensor information is transmitted in multiplexed form between the CPU side and the sensor side, the amount of wiring can be reduced.

The transmission of sensor analog levels to the main controller allows the CPU to know them when required. By knowing sensor analog levels, the CPU can allow for variations from sensor to sensor and changes in sensor characteristic with time. By comparing sensor analog levels with slice levels on the sensor side and transmitting only the results of comparison to the main controller, the amount of transmission can be reduced.

In addition, by sharing serial lines for the transmission of sensor information and sensor circuit control information and the transmission of actuator control information, the number of the serial lines can be reduced. The port forced OFF function can be performed by the hardware on the unit controller side. Setting and operating the forced OFF function can be performed through the use of serial lines. The CPU can inquire the unit controller through serial lines as to whether the forced OFF function has been put into operation.

The present invention is not limited to the described embodiments and may be practiced or embodied in still other ways without departing from the scope and spirit thereof.

As described above, the present invention provides the following advantages:

First, a control system can be provided which permits information captured by each sensor to be sent exactly to a main controller and a fall in the level of sensor signals with time to be automatically compensated for with no need to make sensor signal lines long and without reducing the sensor monitoring accuracy and limiting the number of sensors used. This is because the control system is configured such that sensor signal levels are compared with slice levels on the unit controller side, the results of comparison are transmitted in the form of a serial signal to the main controller, the sensor signal levels are monitored, and the optimum slice levels are set accordingly.

Second, a control system can be provided which has a main controller having a CPU and each of unit controllers for directly controlling unit mechanisms connected together through serial lines and shares the serial lines for a sensor monitoring function and an actuator control function, thereby allowing the number of the serial lines to be reduced.

Third, a control system can be provided which automatically turns off output ports a fixed time after they are turned on to thereby reduce loading of a CPU and improve safety in the event of a CPU malfunction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control system having a main controller and one or more unit controllers each of which has one or more sensors connected, comprising:

select means, provided in each of the unit controllers, for selecting sensor signals produced by the sensors in sequence;

comparison control means, provided in each of the unit controllers, for making a comparison between the level of a sensor signal produced by each of the sensors and a prestored threshold level and holding the result of each comparison;

control means, provided in each of the unit controllers, for converting the contents of the comparison control means into a serial signal and transmitting the serial signal to the main controller;

recognition means, provided in the main controller, for recognizing the results of comparisons sent in serial form from each of the unit controllers;

and slice level change means, controlled by said main controller, for changing the level stored in said comparison control means.

2. The control system according to claim 1, in which the comparison control means further includes an ON/OFF memory for storing an ON/OFF signal for each of the sensors as the result of a comparison between the level of a sensor signal produced by it and a prestored slice level.

3. The control system according to claim 1, in which the slice level change means further includes:

first control means provided in the main controller and having means for setting up a command to request a unit controller to transmit the levels of sensor signals produced by the sensors and transmitting that command to the unit controller;

first command execute means provided in each of the unit controllers and responsive to the command from the first control means for converting the levels of sensor signals produced by each of the sensors into a serial signal and transmitting the serial signal to the main controller;

second control means provided in the main controller and responsive to the levels of sensor signals transmitted from the unit controller for setting slice levels for the sensors, setting up a command to cause the slice levels to be held in the unit controller, and transmitting the command with conversion into a serial signal to the unit controller; and second command execute means provided in each of the unit controllers for causing the slice levels as specified by the command sent from the second control means to be stored in the comparison control means.

4. The control system according to claim 3, further comprising:

control means provided in each of the unit controllers for, upon receipt of the command from the main controller, sending the same command back to the main controller; and control means provided in the main controller and responsive to the command sent back from the unit controller for making an echo back check.

5. A control system having a main controller and a plurality of unit controllers each of which has a plurality of sensors connected, comprising:

select means, provided in each of the unit controllers, for selecting sensor signals produced by the sensors in sequence;

A/D conversion means, provided in each of the unit controllers, for converting the level of each of the sensor signals selected by the select means into digital data;

comparison control means, provided in each of the unit controllers, for making a comparison between output data of the A/D conversion means and prestored each of the slice levels for the sensors and holding the result of each comparison;

designate means, provided in the main controller, for designating each of the unit controllers;

control means, provided in each of the unit controllers, for, when the corresponding unit controller is designated by the designate means, converting the contents of the comparison control means into a serial signal and transmitting the serial signal to the main controller;

recognition means, provided in the main controller, for converting the results of comparisons sent in serial form from each of the unit controllers into parallel form and recognizing them;

and slice level change means, controlled by said main controller for changing the slice level stored in said comparison control means.

6. The control system according to claim 5, in which the comparison control means further includes an ON/OFF memory for storing an ON/OFF signal for each of the sensors as the result of a comparison between the output data of the A/D conversion means and a prestored each of the slice levels.

7. The control system according to claim 5, in which the slice level change means further includes:

first control means provided in the main controller and having means for setting up a command to request a unit controller designated by the designate means to transmit the output data of the A/D conversion means and transmitting that command with conversion into serial form to the designated unit controller;

first command execute means provided in each of the unit controllers and responsive to the command from the first control means for converting the output data of the A/D conversion means into a serial signal and transmitting the serial signal to the main controller;

second control means provided in the main controller and responsive to the data transmitted from the unit controller for setting each of slice levels for the sensors, setting up a command to cause the slice levels to be stored in the unit controller, and transmitting the command with conversion into a serial signal to the unit controller; and second command execute means provided in each of the unit controllers for causing the slice levels as specified by the command sent from the second control means to be stored in the comparison control means.

8. The control system according to claim 7, further comprising:

control means provided in each of the unit controllers for, upon receipt of the command from the main controller, sending the same command back to the main controller; and control means provided in the main controller and responsive to the command sent back from the unit controller for making an echo back check.

9. A control system having a main controller and a plurality of unit controllers each having one or more sensors connected and one or more output ports, comprising:

a sensor circuit, provided in each of the unit controllers, for transmitting sensor information serially over a first serial line to the main controller;

port information transmit means, provided in the main controller, for transmitting ON/OFF information for each of the output ports in each of the unit controllers over a second serial line to the unit controller;

an output port circuit provided in each of the unit controllers and responsive to the ON/OFF information for the output ports transmitted from the port information transmit means for performing ON/OFF control of each of the output ports; and command transmit means provided in the main controller for transmitting a command signal for controlling the operating state of the sensor circuit and a command signal for controlling the operating state of the output port circuit over a third serial line to each of the unit controllers.

10. The control system according to claim 9, in which the sensor circuit includes:

select means for selecting a sensor output signal of each of the sensors in sequence;

an A/D converter for converting a sensor output signal selected by the select means into a digital signal;

storage means for storing threshold level information for each sensor;

compare means for making a comparison between the output data of the A/D converter for each of the sensors and the corresponding threshold level information stored in the storage means; and sensor information transmit means for transmitting the result of the comparison by the compare means as sensor information over the first serial line to the main controller.

11. The control system according to claim 9, in which the unit controller further comprises a motor control circuit for controlling the movement of a motor and wherein the command transmit means transmits a command signal for controlling starting and stopping the motor over the third serial line to the unit controller.

12. The control system according to claim 11, in which the sensor circuit includes:

select means for selecting a sensor output signal of each of the sensors in sequence;

an A/D converter for converting a sensor output signal selected by the select means into a digital signal;

storage means for storing threshold level information for each sensor;

compare means for making a comparison between the output data of the A/D converter for each of the sensors and the corresponding threshold level information stored in the storage means; and sensor information transmit means for transmitting the result of the comparison by the compare means as sensor information over the first serial line to the main controller.

13. The control system according to claim 9, wherein the unit controller further comprises response transmit means for transmitting a response of the result of execution of a command transmitted from the command transmit means over a fourth serial line to the main controller.

14. The control system according to claim 13, in which the sensor circuit includes:

select means for selecting a sensor output signal of each of the sensors in sequence;

an A/D converter for converting a sensor output signal selected by the select means into a digital signal;

storage means for storing threshold level information for each sensor;

compare means for making a comparison between the output data of the A/D converter for each of the sensors and the corresponding threshold level information stored in the storage means; and sensor information transmit means for transmitting the result of the comparison by the compare means as sensor information over the first serial line to the main controller.

15. The control system according to claim 9, in which the unit controller further comprises a motor control circuit for controlling the movement of a motor and response transmit means for transmitting a response of the result of execution of a command transmitted from the command transmit means over a fourth serial line to the main controller and wherein the command transmit means transmits a command signal for controlling starting and stopping the motor over the third serial line to the unit controller.

16. The control system according to claim 15, in which the sensor circuit includes:

select means for selecting a sensor output signal of each of the sensors in sequence;

an A/D converter for converting a sensor output signal selected by the select means into a digital signal;

storage means for storing threshold level information for each sensor;

compare means for making a comparison between the output data of the A/D converter for each of the sensors and the corresponding threshold level information stored in the storage means; and sensor information transmit means for transmitting the result of the comparison by the compare means as sensor information over the first serial line to the main controller.

17. In a control system having a main controller and one or more unit controllers having one or more output ports, each of the unit controllers includes:

clock generating means for generating a clock signal;

counter means for counting the clock signal and producing a forced OFF signal at the time when a preset clock count is reached;

ON/OFF information hold means for holding ON/OFF information for the output ports;

edge detect means for detecting a change in the ON/OFF information in the ON/OFF information hold means and providing a count enable signal to the counter means at the time when the change is detected; and control means for instructing the counter means as to either whether to output,-the forced OFF signal or not or whether to count the clock signal or not according to an operation mode set by the main controller.

18. The control system according to claim 17, wherein each of the unit controllers further includes select means for making a selection among multiple clocks according to an operation mode set by the main controller and wherein the preset clock count in the counter means is set by the main controller.

19. The control system according to claim 17, wherein the main controller further includes designate means for designating each of the unit controllers in sequence and transmission control means for holding ON/OFF control information for the output ports of the unit controllers and transmitting ON/OFF information for the output ports of a unit controller designated by the designate means with conversion into a serial signal to the designated unit controller.

20. The control system according to claim 17, wherein the main controller further includes designate means for designating each of the unit controllers in sequence, transmission control means for holding ON/OFF control information for the output ports of the unit controllers and transmitting ON/OFF information for the output ports of a unit controller designated by the designate means with conversion into a serial signal to the designated unit controller, and each of the unit controllers further includes clock generating means for generating multiple clocks and select means for making a selection among multiple clocks according to an operation mode set by the main controller and wherein the preset clock count in the counter means is set by the main controller.

21. The control system according to claim 17, wherein the main controller further includes designate means for designating each of the unit controllers in sequence, information hold means for holding ON/OFF control information for the output ports of the unit controllers, transmission control means for transmitting ON/OFF information for the output ports of a unit controller designated by the designate means with conversion into a serial signal to the designated unit controller, and command hold and transmit means for holding a command to control the operation of each unit controller and transmitting it to the unit controller.

22. The control system according to claim 17, wherein the main controller further includes designate means for designating each of the unit controllers in sequence, information hold means for holding ON/OFF control information for the output ports of the unit controllers, transmission control means for transmitting ON/OFF information for the output ports of a unit controller designated by the designate means with conversion into a serial signal to the designated unit controller, and command hold and transmit means for holding a command to control the operation of each of the unit controllers and transmitting it to the corresponding unit controller, and each of the unit controllers further includes select means for making a selection among multiple clocks according to an operation mode set by the main controller, the preset clock count in the counter means being set by the main controller.

23. The control system according to claim 17, wherein the main controller includes designate means for designating each of the unit controllers in sequence, information hold means for holding ON/OFF control information for the output ports of the unit controllers, transmission control means for transmitting ON/OFF information for the output ports of a unit controller designated by the designate means with conversion into a serial signal to the designated unit controller, and command hold and transmit means for holding a command to control the operation of each unit controller and transmitting it to the unit controller, and each of the unit controllers includes: output port means comprising clock generating means for generating a clock, counter means for counting the clock and producing a forced OFF signal at the time when a preset clock count is reached, ON/OFF information hold means for holding ON/OFF information for the output ports, edge detect means for detecting a change in the ON/OFF information in the ON/OFF information hold means and providing a count enable signal to the counter means at the time when the change is detected, and control means for instructing the counter means as to either whether to output the forced OFF signal or not or whether to count the clock or not according to an operation mode set by the main controller; and operation result transmit means for holding the result of operation transmitted from the output port means and transmitting it to the main controller.

24. The control system according to claim 17, wherein the main controller includes designate means for designating each of the unit controllers in sequence, information hold means for holding ON/OFF control information for the output ports of the unit controllers, transmission control means for transmitting ON/OFF information for the output ports of a unit controller designated by the designate means with conversion into a serial signal to the designated unit controller, and command hold and transmit means for holding a command to control the operation of each unit controller and transmitting it to the unit controller, and each of the unit controllers includes: output port means comprising clock generating means for generating a clock, counter means for counting the clock and producing a forced OFF signal at the time when a preset clock count is reached, ON/OFF information hold means for holding ON/OFF information for the output ports, edge detect means for detecting a change in the ON/OFF information in the ON/OFF information hold means and providing a count enable signal to the counter means at the time when the change is detected, control means for instructing the counter means as to either whether to output the forced OFF signal or not or whether to count the clock or not according to an operation mode set by the main controller, and select means for making a selection among multiple clocks according to an operation mode set by the main controller; and operation result transmit means for holding the result of operation transmitted from the output port means and transmitting it to the main controller, the preset clock count in the counter means being set by the main controller.

* * * * *